United States Patent [19]

Okamoto et al.

[11] Patent Number: 4,652,036
[45] Date of Patent: Mar. 24, 1987

[54] AIR SPOILER

[75] Inventors: Harutaka Okamoto, Nishikasugai; Tetsumi Ichioka, Iwakura; Takashi Kato, Ichinomiya, all of Japan

[73] Assignee: Toyoda Gosei Co., Ltd., Nishikasugai, Japan

[21] Appl. No.: 777,076

[22] Filed: Sep. 17, 1985

[30] Foreign Application Priority Data

Sep. 17, 1984 [JP] Japan ............... 59-194999
Sep. 19, 1984 [JP] Japan ............ 59-141736[U]

[51] Int. Cl.⁴ ............... B62D 35/00; B64C 3/26
[52] U.S. Cl. ............... 296/1 S; 296/31 P; 296/91; 293/120; 244/123; 244/132
[58] Field of Search ............... 296/1 S, 91, 31 P; 293/120; 244/123, 132

[56] References Cited

U.S. PATENT DOCUMENTS

| | | | |
|---|---|---|---|
| 2,477,113 | 7/1949 | Campbell | 244/123 |
| 3,231,076 | 1/1966 | Freiman | 24/336 |
| 3,938,841 | 2/1976 | Glance et al. | 293/120 |
| 4,274,670 | 6/1981 | Pitzmann | 296/1 S |
| 4,323,274 | 4/1982 | Soderberg et al. | 296/1 S |
| 4,558,898 | 12/1985 | Deaver | 296/1 S |

FOREIGN PATENT DOCUMENTS

| | | | |
|---|---|---|---|
| 2250908 | 5/1973 | Fed. Rep. of Germany | 293/120 |
| 2555006 | 6/1977 | Fed. Rep. of Germany | 296/1 S |
| 3240492 | 5/1984 | Fed. Rep. of Germany | 296/1 S |

Primary Examiner—Robert B. Reeves
Assistant Examiner—Dennis H. Pedder
Attorney, Agent, or Firm—Cushman, Darby & Cushman

[57] ABSTRACT

In an air spoiler of wing type made of plastics material to be installed on the rear of a vehicle body, an air spoiler body is molded integrally with a mounting assisting member formed between an upper surface and a lower surface of the air spoiler body and along the longitudinal direction thereof. A mounting member, constructed separately, has one end joined to the rear, i.e. inner, side of the upper surface of the air spoiler body and has its other end locked to the mounting assisting member. The air spoiler is tightened by bolts to the vehicle through the mounting member. Accordingly, sink marks, such as may appear with an integrally-formed mounting member are not produced on the upper surface of the air spoiler body during the molding process and strain such as such as would be evident by causing the appearance of wavy forms on the upper surface at the installation state is reduced.

6 Claims, 12 Drawing Figures

AIR SPOILER

BACKGROUND OF THE INVENTION

The present invention relates to an air spoiler of the wing type, which is disposed to rear side of a vehicle and pushes the vehicle towards the road surface utilizing the air flow during high-speed running of the vehicle and increases the drive force and the brake force of the vehicle. More particularly, the invention relates to an air spoiler molded of plastics material.

An air spoiler in the prior art has the structure which is shown in FIG. 1 and FIG. 2. FIG. 1 is a perspective view of an air spoiler in the prior art, and FIG. 2 is a sectional view of the air spoiler taken in line II—II of FIG. 1.

In the figures, an air spoiler body 1 has length $L_1$ specified depending on the body width of the vehicle to which the air spoiler is installed, and width $L_2$ of an upper surface 2 and slanting angle specified depending on the vehicle speed and the installation position respectively. An opening 3 of the air spoiler body 1 is provided with a plurality of mounting members 4 formed integrally so as to permit installation of the air spoiler to the vehicle. The mounting members 4 have function also as reinforcing members to hold securely the distance between the upper surface 2 and the lower surface 5 of the air spoiler. Each mounting member 4 has cross-section form usually composed of a plane parallel to the longitudinal direction of the air spoiler body 1 and a plane orthogonal thereto. Of course, when the length $L_1$ of the air spoiler body 1 is large and the thickness of the air spoiler body 1 is small, reinforcing member 7 of a required number composed of planes orthogonal to the longitudinal direction of the air spoiler body 1 are formed integrally therewith. Each mounting member 4 is provided with a fitting recess 6 to fit a T-bolt. The air spoiler body 1 is fixed to the vehicle body by the T-bolts fitted to the fitting recesses 6. The fitting recesses 6 are arranged in zig-zag form with respect to the longitudinal direction of the air spoiler body 1; the mounting is thereby stabilized.

FIG. 3 is a sectional view of the air spoiler body 1 in the prior art, illustrating an example of the installed state.

Each T-bolt 10 is fitted to a respective fitting recess 6 of the air spoiler body 1 and inserted in a corresponding mounting hole 11a bored in the vehicle body 11 and threadably engaged with a nut 10a. The ends of the upper surface 2 and the lower surface 5 of the air spoiler abut on the window glass sealing rubber 13 between the rear window glass 12 and the vehicle body 11 or only the vehicle body 11 through elastic bodies 14 and 15, respectively.

The air spoiler body 1 is made of plastics material such as ABS resin by means of injection molding. Particularly, in order to mold the mounting member 4, a slide core is used.

In such an air spoiler, however, sink marks may be produced at the molding position of the joining point between the air spoiler body 1 and the mounting member 4. The sink marks appear as linear dents on the surface of the air spoiler or as wavy forms by depression under some conditions. Particularly, when the sink marks on the upper surface of the air spoiler are subjected to solar reflection, the presence of each such sink mark as an imperfection becomes quite obvious. This is not preferable from the view point of good appearance.

The present invention is directed at providing an air spoiler which does not have such sink mark-type surface imperfections.

SUMMARY OF THE INVENTION

An air spoiler of the invention comprises a mounting assisting member formed integrally on the inside of an air spoiler body between an upper surface and a lower surface of the air spoiler body and extending in the longitudinal direction thereof, and a mounting member with one end joined to the inside of the upper surface of the air spoiler body, the other end of this mounting member being locked to the mounting assisting member. Or an air spoiler is molded in hollow form by means of blow molding, a recess having a rising wall in the width direction is provided at the lower surface of the air spoiler, and a fitting washer is molded integrally to the recess.

Accordingly, an object of the invention is to provide an air spoiler wherein the air spoiler body is made uniform in thickness and can be molded easily, and the fixing between the air spoiler body and the mounting member is effected by joining at one side and by locking at the other side, thereby sink marks and strain marks are not produced on the upper surface of the air spoiler body.

Another object of the invention is to provide an air spoiler which is of light weight and has the required rigidity and the mounting intensity.

DESCRIPTION OF THE PREFERRED EMBODIMENTS

Figure 1:
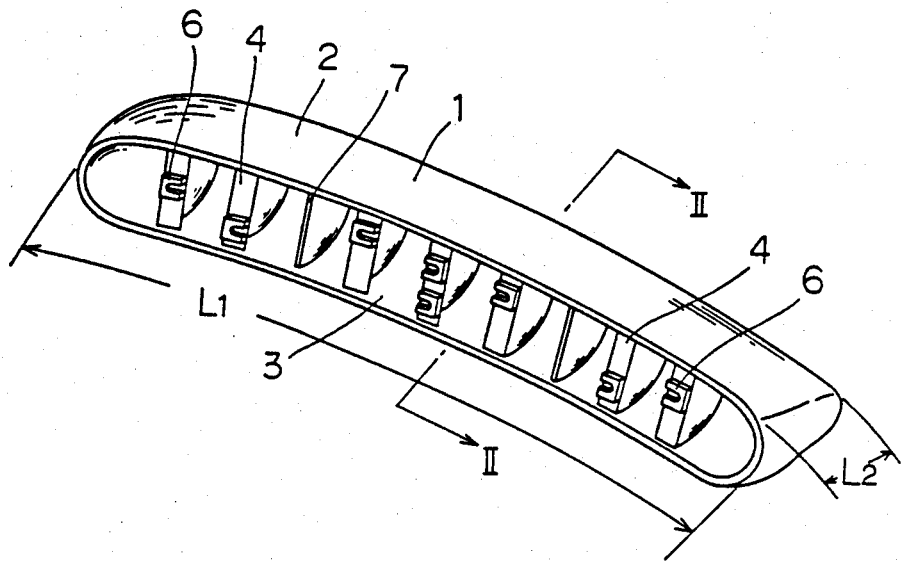
FIG. 1 is a perspective view of an air spoiler in the prior art.
Figure 2:
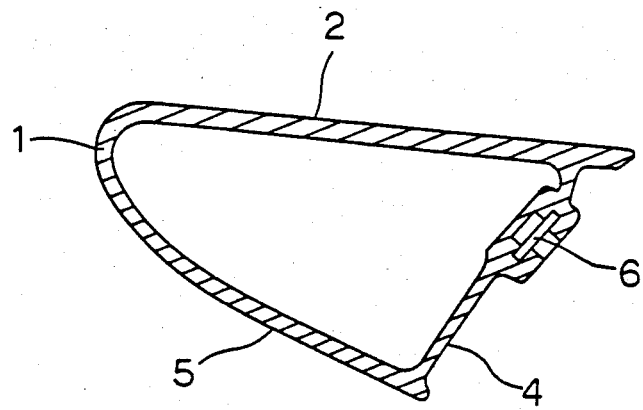
FIG. 2 is a sectional view taken in line II—II of FIG. 1.
Figure 4:
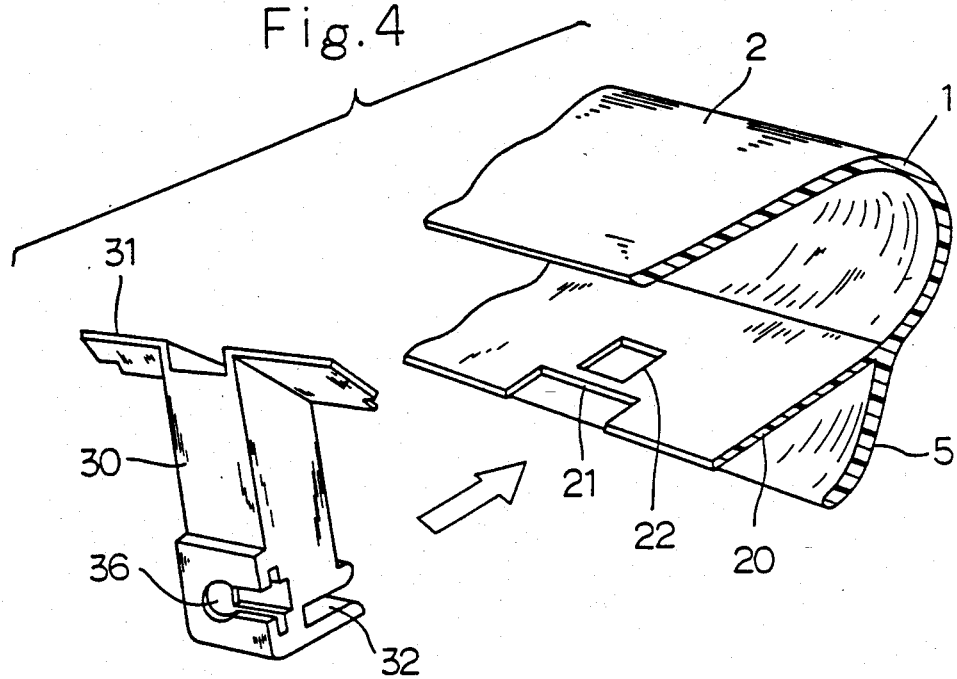
FIG. 4 is a perspective view of assembling parts of an air spoiler as an embodiment of the invention.
Figure 3:
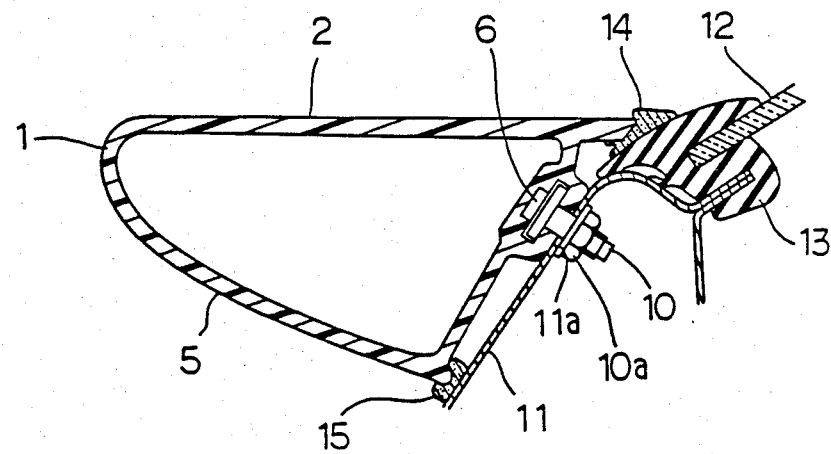
FIG. 3 is a sectional view of the air spoiler in the prior art illustrating the installed state.
Figure 5:
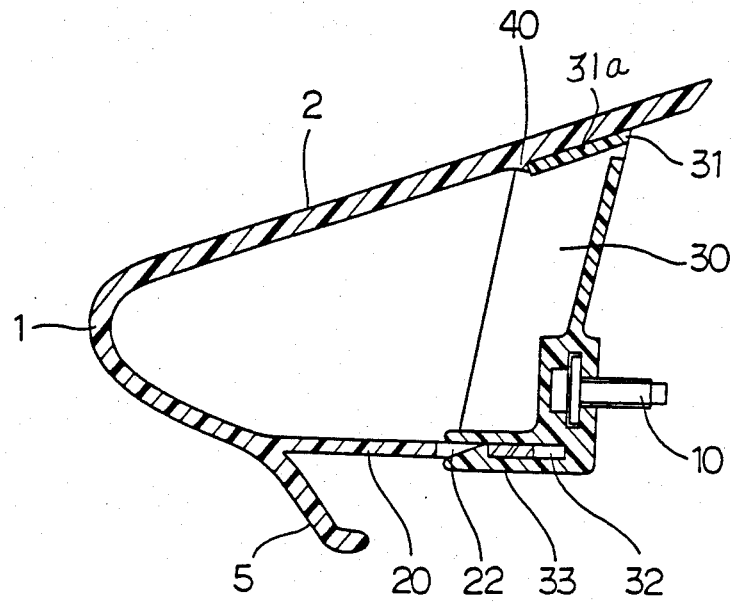
FIG. 5 is a sectional view of the air spoiler illustrating assembled state.

FIG. 4 is a perspective view, partly in section, of an air spoiler of a first embodiment of the invention, illustrating the assembly of its constituent parts. FIG. 5 is a sectional view of an air spoiler body with a mounting member assembled thereon.

In the figures, an air spoiler body 1, an upper surface 2 which faces downwardly on an upper wall, a lower surface 5 which faces upwardly on a lower wall. The upper and lower walls meet towards the rear edge of the body 1 and diverge forwardly of where they meet thereby defining a cavity in which the surfaces 2 and 5 are located and a T-bolt 10 are designated by the same reference numerals as those used for the corresponding elements in the prior art, and represent parts being the same as or similar to parts in the prior art.

The mounting assisting member 20 is a flat plate part formed integrally along the longitudinal direction of the air spoiler body 1. The mounting assisting member 20 is preferably made thinner than the material of the air spoiler body 1 so that it can be bent vertically by external force applied thereto in the vertical direction and the external force not be transmitted to the air spoiler body 1. Even when the mounting assisting member 20 is as thick as the material of the air spoiler body 1, since the former is formed as a flat plate and the latter is curved, the intensity becomes stronger at side of the air spoiler body 1, and if pushing force is applied between the mounting assisting member 20 and the upper surface 2 of the lower surface 5 of the air spoiler body 1, the mounting assisting member 20 will be bent. However, a construction wherein the mounting assisting member 20 is thinner than the material of the air spoiler body 1 as above described is more effective.

The length of the mounting assisting member 20 may be equal to the overall length of the air spoiler body 1 or approximately equal to length of the body. The mounting members are formed integrally. If the length of the mounting assisting member 20 were to be made equal to the overall length of the air spoiler body 1, the end of the mounting assisting member 20 would correspond to end of the air spoiler body 1, and, as a result, the end of the air spoiler body 1 may be sunk, resulting in bad appearance. When the length of the mounting assisting member 20 is made less than the overall length of the air spoiler body 1, the end of the air spoiler body 1 does not abut on the mounting assisting member 20 and therefore is not sunk as above described.

The mounting assisting member 20 has such length that mounting members of required number can be arranged, and if the mounting members are formed integrally at rear side of the lower surface 5 of the air spoiler body 1, the intensity and stability of the air spoiler body 1 become good.

The mounting assisting member 20 is provided with recesses 21 and engaging holes 22 of required number.

Figure 5A:
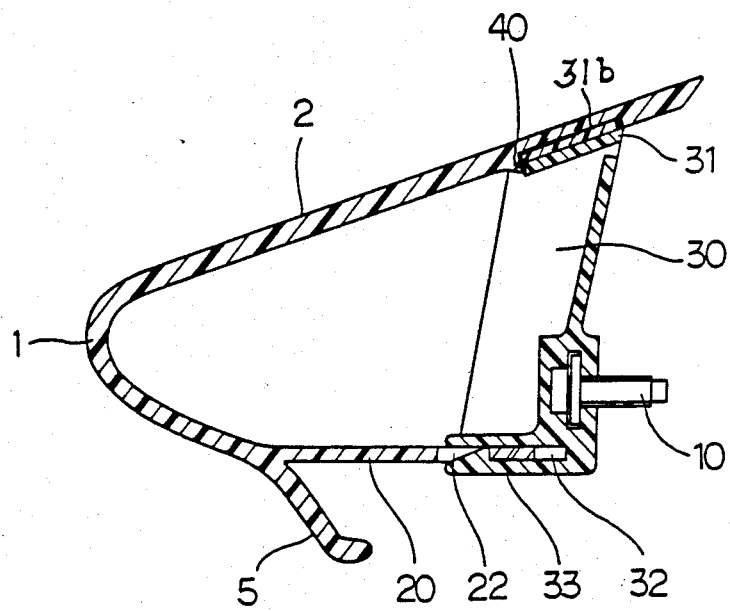
FIG. 5a is a fragmentary sectional view showing adhesion as an alternative means for securing the mounting member to the air spoiler body.
Figure 6:
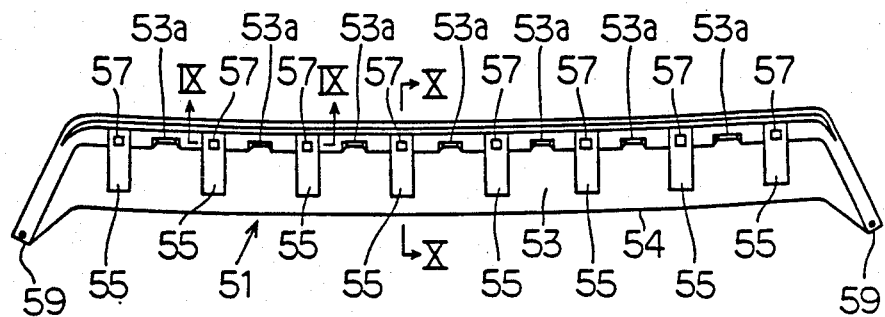
FIG. 6 is a bottom view of an air spoiler as another embodiment of the invention.

A mounting member 30 is provided at top end with a joining part 31. When the joining part 31 is welded by means of an ultrasonic welding process (i.e. the variation illustrated in FIG. 5), a linear projection 31a is formed on the upper surface thereof so as to facilitate the welding by vibration. When the joining part 31 is joined by an adhesive agent (i.e. the variation illustrated in FIG. 5a, in which the numeral 31b designates the adhesive agent), Knurling is applied to upper surface thereof so as to enlarge the surface area. In any case, the joining part 31 is joined only at the surface portion. However, the joining method is not restricted to above mentioned method. Another method may be used as long as it does not effect the upper surface 2 of the air spoiler 1. Of course, the area of the joining part 31 is specified to a suitable width to obtain the necessary joining intensity.

A locking part 32 is formed at bottom end of the mounting member 30. The locking means of the locking part 32 is so constituted that when the engaging hole 22 of the mounting assisting member 20 and a locking pawl 33 of the locking part 32 are once locked both parts cannot be easily separated from each other. In the first embodiment, the above construction effects the fixing by the locking between the engaging hole 22 of the mounting assisting member 20 and the locking pawl 33 of the locking part 32. However, the construction is not restricted to the embodiment. That is, the fixing by the locking pawls arranged on upper and lower sides of the locking part 32 of the mounting member 30, and the fixing between the mounting assisting member 20 and the mounting member 30 are preferably connected loose coupling with some degree of freedom between both members. In the loose coupling with a degree of freedom between both members, strain generated between the upper surface 2 of the air spoiler body 1 and the mounting assisting member 20 can be absorbed by the freedom. For example, even when the mounting assisting member 20 is made as thick as the air spoiler body 1, the strain generated between the upper surface 2 of the air spoiler body 1 can be absorbed by the freedom.

On the opposite side from the locking part 32 an the mounting member 30, a fitting recess 36 to fit the T-bolt 10 is provided at any height. The height of the fitting recess 36 is determined depending on the mounting condition. Although the fitting recess 36 fits the T-bolt 10 in the embodiment, a bolt or a nut may be embedded directly in the mounting member 30 by molding.

The air spoiler body 1 and the mounting member 30 are molded and assembled as follows:

First, the air spoiler body 1 is molded by injection molding. Since a metal mold can be pulled away straight from the opening side of the air spoiler body 1 then, a slide core need not be used and the cooling effect may be performed with consideration for the balance. The mounting member 30 is molded by another metal mold.

The air spoiler body 1 and the mounting member 30 after finishing the molding are pushed in the arrow direction of FIG. 4 until the locking pawl 33 of the locking part 32 of the mounting member 30 is locked to the engaging hole 22 of the mounting assisting member 20. If one side of the engaging hole 22 and the locking pawl 33 are locked, the joining part 31 is fixed at abutting position on a guide projection 40 provided on rear side of the upper surface 2 of the air spoiler head 1. The horn of an ultrasonic welding tool is pushed against the plane of the joining part 31, and the joining part 31 and the rear side of the upper surface 2 are welded by means of ultrasonic waves. The mounting members 30 of the required number are mounted on the air spoiler body 1 and fixed in sequence by a similar process. And then the T-bolt 10 is inserted into the fitting recess 36 of each mounting member 30.

In the air spoiler of the embodiment, if the cross-section of the mounting member 30 is formed so as to have a U-like shape, the intensity is increased. Since the width of the reinforcing material in a direction perpendicular to the longitudinal direction of the air spoiler body may be set arbitrarily, the intensity can be selected arbitrarily.

As above described, an air spoiler of the invention comprises a mounting assisting member formed integrally between upper and lower surfaces of the air spoiler body and in the longitudinal direction thereof, and a mounting member with one end joined to rear side of the upper surface of the air spoiler body and other end locked to the mounting assisting member. Consequently, the air spoiler may be constituted so as not to have sink marks formed in it during the molding process, and strain such as such as would be apparent as wavy forms on the upper surface of the air spoiler is reduced.

Moreover, the metal mold to be used for molding the air spoiler body may be of simple form; thereby the cost for the metal mold becomes inexpensive.

FIGS. 6 through 11 show an air spoiler of another embodiment of the invention.

The air spoiler body 51 is made of Noryl, PP, ABS resins, for example by means of blow molding, and the inside thereof becomes hollow.

Figure 7:
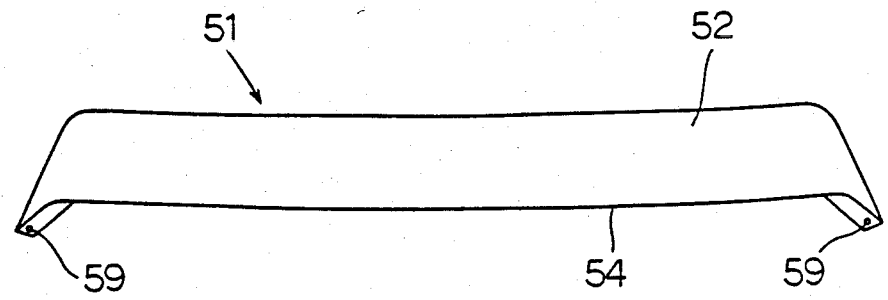
FIG. 7 is a plan view of the air spoiler.
Figure 8:
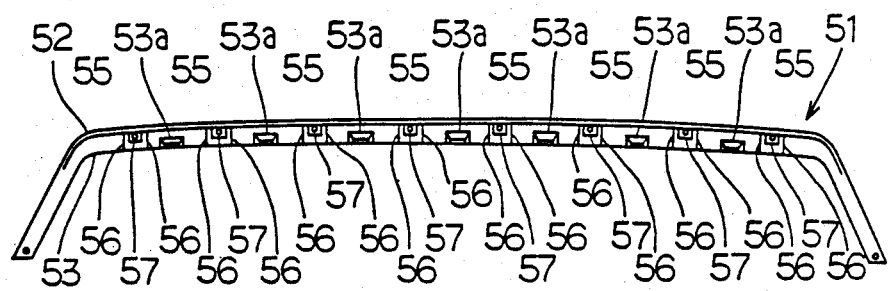
FIG. 8 is a front view of the air spoiler.
Figure 9:
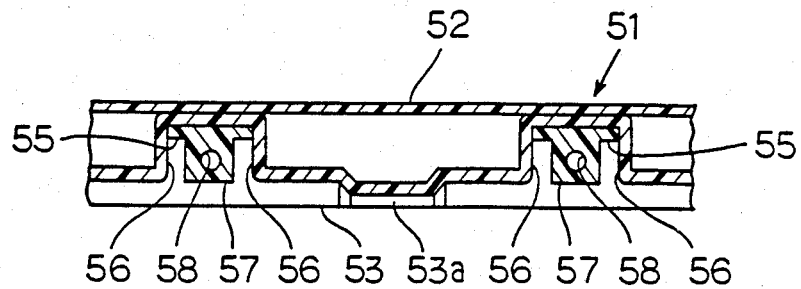
FIG. 9 is an enlarged sectional view taken in line IX—IX of FIG. 6.
Figure 10:
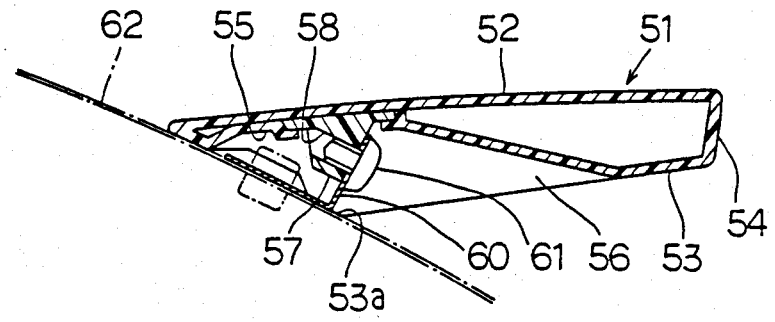
FIG. 10 is an enlarged sectional view taken in line X—X of FIG. 6.

The upper surface 52 of the air spoiler 51 has a horizontal portion which is nearly flat, and both of its end portions are smoothly bent downward so as to form end supports (refer to FIG. 7).

The lower surface 53 of the air spoiler body 51 is provided with a number of recesses 55 arranged thereon, and a fitting washer 57 is fixed integrally to each recess 55 during the blow molding (refer to FIGS. 6, 8, 9, 11).

The recesses 55 are provided with long rising walls in the width direction of the air spoiler body 5 and arranged at regular intervals.

Figure 11:
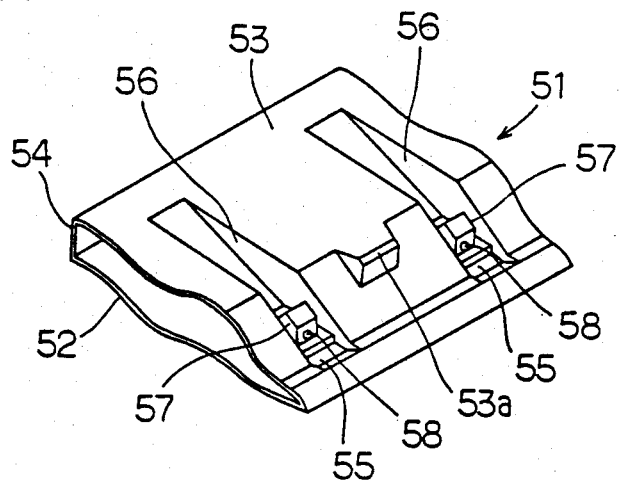
FIG. 11 is a rear perspective view of the air spoiler of FIG. 6.

A fitting washer 57, of square bar form in the embodiment illustrated, is fixed to a prescribed position of the recess 55, and a mounting hole 58 penetrating in the width direction of the spoiler body 51 is bored on the fitting washer 57 (refer to FIG. 11).

The air spoiler in such construction is threadably installed to a mounting member 60 arranged to a prescribed position of the car body by a bolt 61 to the mounting hole 58 of the fitting washer 57. It is threadably installed also to a mounting hole 59 at end portion thereby installed to a roof rear part 62 as clearly seen in FIG. 10 for example.

The fitting washer 57 is sufficiently thick to enable its being threadedly tapped.

The abutting parts 53a are arranged at intermediate portions of the recesses 55 so as to abut on a number of positions of the roof rear part 62; thereby the joining positions of the air spoiler with the roof rear part 62 are increased and the mounting intensity is further reinforced.

Although the plane figure of the recess 55 is rectangular form in the illustrated embodiment, it may be triangular or oval in form and is not specifically restricted as long as the effective rising wall can be formed in the width direction of the air spoiler body 51.

The fitting washer 57 may be formed integrally with the air spoiler body 51. For example, the fitting washer 57 as separate body may be welded or bonded with the air spoiler body 51.

As above described, the air spoiler body 51 is molded in hollow form by means of blow molding and the fitting washer 57 is molded integrally with the lower surface of the air spoiler body 51. Since no projection is not produced at rear side of the upper surface 52 of the air spoiler body 51, the spoiler is not sunk during the molding but can be finished in good appearance.

Since the recesses 55 and the fitting washers 57 therewithin are molded integrally to the lower surface 53 of the air spoiler body 51 by means of the blow molding, the rising walls 56 of a number of arranged recesses 56 provide the air spoiler with the required rigidity and also the sufficient mounting intensity. Moreover, the weight is significantly reduced in comparison to a conventional air spoiler using steel plate inserts, and an air spoiler of low cost can be manufactured.

What is claimed is:

1. An air spoiler for the rear of an automobile body, comprising:
    an air spoiler body molded of plastics material so as to have an upper wall and a lower wall, these two walls being joined to one another along a rear edge, and being spaced apart forwardly of said rear edge to define a forwardly opening cavity defined at least in part by a generally downwardly facing inner surface of said upper wall and a generally upwardly facing inner surface of said lower wall;
    said spoiler body being elongated so as to have a longitudinal direction thereof adapted to extend transversally of the rear of an automobile body;
    said air spoiler body including a mounting assisting member integrally formed at a rear portion with one of said upper and lower walls within said cavity, this mounting assisting member being elongated in said longitudinal direction of said spoiler body and extending forwardly intermediate said upper and lower walls; and
    at least one mounting member, each said mounting member comprising a separate, generally vertically extending element connecting one of said walls with said mounting assisting member and therefore being joined at one end thereof to said inner surface of one of said walls within said cavity and mechanically locked at another end thereof to a front portion of said mounting assisting member;
    each said mounting member further including means adapted to mount that mounting member, and thereby the air spoiler, to the rear of an automobile body.

2. An air spoiler as set forth in claim 1, wherein said other end of the mounting member is loosely coupled with the mounting assisting member.

3. An air spoiler as set forth in claim 1, wherein said other end of the mounting member and the mounting assisting member are fixed by locking between an engaging hole and a locking pawl.

4. The air spoiler of claim 1, wherein:
    said vertically-extending element of each said mounting member is joined at an upper end thereof to said inner surface of said upper wall within said cavity, by a weldment.

5. The air spoiler of claim 1, wherein:
    said vertically-extending element of each said mounting member is joined at an upper end thereof to said inner surface of said upper wall within said cavity, by adhesive bonding.

6. The air spoiler of claim 1, wherein:
    said mounting assisting member is integrally joined to said lower wall within said cavity.

* * * * *